March 1, 1932.    M. LOUGHEAD    1,847,402
BRAKE MECHANISM
Filed Sept. 6, 1928
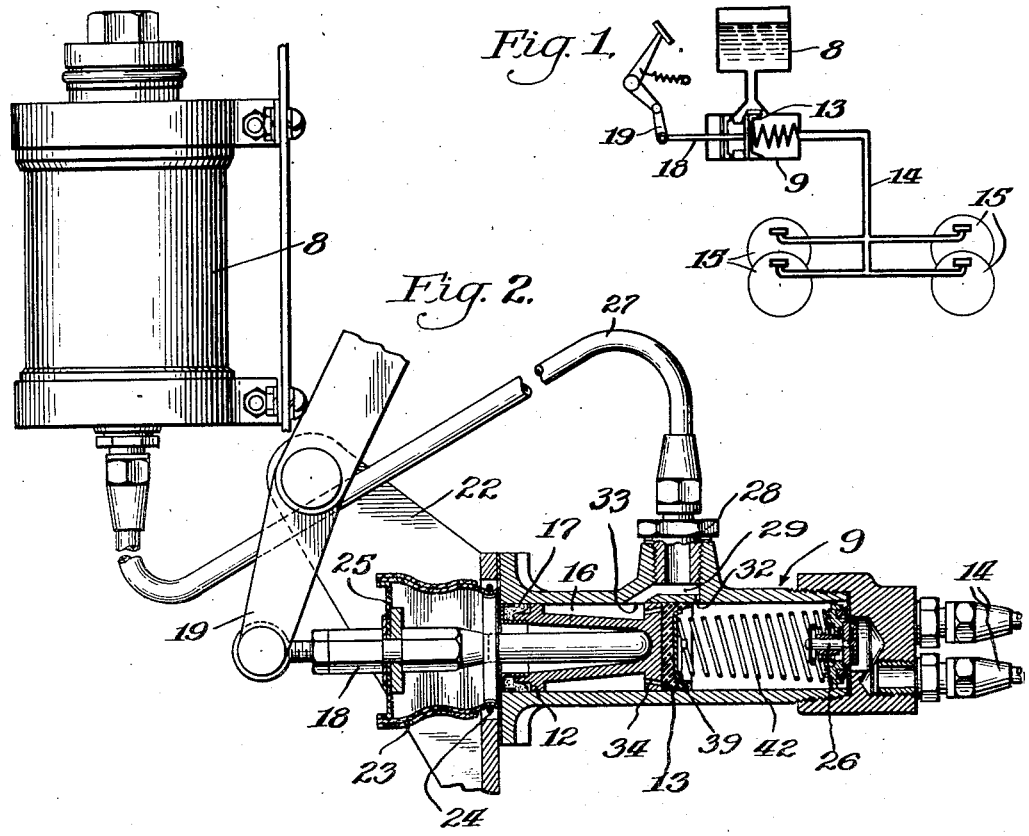
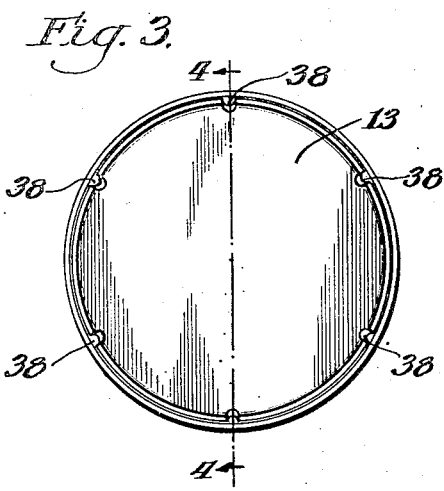
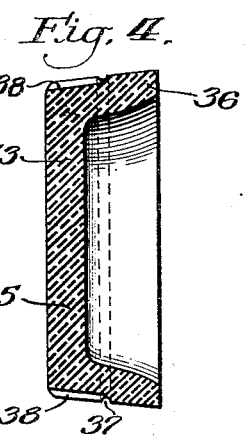
Inventor
Malcolm Loughead
By Williams, Bradbury, McCaleb + Hinkle
Atty's.

Patented Mar. 1, 1932

1,847,402

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

BRAKE MECHANISM

Application filed September 6, 1928. Serial No. 304,195.

This invention relates to hydraulic brake systems, and particularly to improvements in the master cylinders for hydraulic brake systems.

An object of the invention is to provide an improved master cylinder for a hydraulic brake system.

A further object is to provide a master cylinder having a master piston provided with a packing cup which cooperates with the piston to interrupt communication between the master cylinder and fluid reservoir at the beginning of the protractile movement of the piston.

A further object is to provide a master cylinder having a master piston provided with a packing member adapted to facilitate the passage of liquid by the packing member during the retraction of the piston.

A further object is to provide a master cylinder and fluid supply system having an improved packing for the master piston permitting the piston to retract freely and admit a fluid to the master cylinder in greater quantities than actually required for operation, surplus liquid so admitted being discharged into the reservoir by the retraction of the brake cylinders until the proper quantity of fluid remains in the cylinder.

Other objects and advantages of the invention will appear as the description proceeds.

In the drawings,

Fig. 1 is a schematic illustration of a complete hydraulic brake installation, including the master cylinder;

Fig. 2 is a side elevation, partly in section, of the master cylinder;

Fig. 3 is an end view of the packing member; and

Fig. 4 is a cross section of the packing member taken on line 4—4 of Fig. 3.

In general, the invention consists of a reservoir 8, a master cylinder 9 disposed in a plane beneath the reservoir, a manually operable piston 12 within the cylinder having a packing member 13, fluid pressure pipes 14 communicating with the fluid pressure operated wheel brakes 15 and a system of passages and recesses in the cylinder and piston for replenishing fluid in the cylinder and for exhausting air bubbles from the cylinder.

Piston 12 is elongated and has a deep annular recess 16 providing a fluid seal for the piston. The rearward end of the piston 12 carries an annular packing ring 17.

The piston is moved forwardly by means of a rod 18 which engages a deep pocket in the piston and is pivotally attached at the opposite end to a manually operated lever 19 carried by a bracket 22 which also supports the master cylinder.

In order to exclude dust and other extraneous substances from the walls of cylinder 9, a flexible cylindrical boot 23 is provided, one end of which is secured by a ring 24 to the bracket 22 and the opposite end of which is secured to a disk 25 mounted concentrically about the rod 18.

A double acting check valve 26 is mounted at the innermost end of cylinder 9 and performs the function of maintaining a slight positive pressure in the fluid system, including the fluid pressure wheel brake cylinders and the pipes 14, thus reducing the possibility of the admission of air into the master cylinder to a minimum degree. A fluid supply is maintained in the reservoir 8, where it is free to flow by gravity through a tube 27 through an internally bored plug 28 into a chamber 29 formed in the cylinder wall at the top and midpoint of the cylinder. A small passage 32 through the cylinder wall communicates with the interior of the cylinder immediately in front of the inner end of the packing cup 13 when the piston is in its full retractive position. A larger passage 33 connects the chamber 29 at a point intermediate the length of the piston to the annular recess 16 of the piston. The length of the recess 16 is such as to maintain communication between the passage 33 and the recess 16 throughout the full piston movement.

A pair of bleed passages 34 is provided through the forward portion or head of the piston interconnecting the recess 16 with the space immediately in front of the piston and which is closed when the packing cup engages with the inner end of the piston. The packing cup comprises a flat disk shaped portion 35 surrounded by a peripheral flange 36 extending axially from the disk shaped portion. The lateral surface of the packing cup is provided with an annular groove 37 surrounding the packing cup and a plurality of grooves 38 extending in an axial direction from the annular groove 37 to the piston. The grooves 38 are preferably of a greater depth than groove 37. The packing cup is held in place by a washer 39 against which compression spring 42 acts to return the piston to its retractive position.

In the operation of the apparatus, the forward movement of the piston causes a fluid pressure in the cylinder, which firmly forces the peripheral flange 36 of the packing cup into engagement with the cylindrical wall of the master cylinder so that no fluid can escape by the packing cup when the piston is moving forwardly. Upon the retractile movement of the piston, the fluid pressure in the cylinder 9 will decrease on account of the check valve 26, which retards the return flow of the fluid into the cylinder. The fluid pressure in recess 16, which remains the same, becomes greater than the fluid pressure in the master cylinder during the retractile movement of the piston, allowing the fluid pressure acting through bleed passages 34 to unseat the packing cup and allow the fluid from recess 16 to flow into the master cylinder. The grooves in the packing cup facilitate the passage of fluid by the packing cup. It will be evident that the packing has the least radial compressibility in the disk shaped portion at its base. The grooves which are located in the disk shaped portion on the periphery of the cup compensate for the rigidity of the cup at this point and allow fluid to pass forwardly. The flange 36 having a greater flexibility, may be readily moved in an inward radial direction to allow the fluid to pass. The fluid upon reaching the annular groove 37 through the grooves 38 surrounds the entire periphery of the packing cup, exerting a radial inward pressure and assisting in unseating the cup from engagement with the walls of the cylinder to let the fluid pass forwardly.

In this manner at the end of the retractive movement of the piston 12, there is a greater quantity of fluid in cylinder 9 and in the pipes 14 and fluid pressure wheel brake cylinders than is necessary for the operation of the system. As a result of this condition, continued cylinderwise movement of the fluid as the wheel cylinder pistons move to their retractive position will cause all excess fluid in the cylinder 9, together with any air bubbles which might accumulate, to pass up through the small passage 32 into chamber 29 and thence to reservoir 8.

The piston of the herein described brake system will therefore always move freely to its retracted position and provide sufficient fluid in the cylinder and the associated pressure system to immediately cause responsive movement of the wheel brakes when the piston is moved forwardly.

Having described the nature and embodiments of my invention, what I desire to secure by United States Letters Patent is as follows:

1. A packing cup for a movable piston in a master cylinder of a hydraulic braking system, comprising a disk-shaped portion, a peripheral flange thereon, said disk-shaped portion having a groove extending axially thereof to facilitate forward movement of fluid past the piston and said cup.

2. A packing cup for the head of a movable piston in a master cylinder of a hydraulic braking system, comprising a peripheral portion, said peripheral portion having a groove whereby movement of fluid from behind the piston head to a position in front of the piston head and past said portion is facilitated when fluid pressure behind the piston head exceeds pressure in front of the piston head.

3. A packing member for a master cylinder piston having a bleed passage therein, comprising a portion engageable with the wall of the cylinder, said portion having a groove extending axially through less than the length of the packing member, to facilitate forward movement of fluid through the bleed passage in the piston and past said portion.

4. A packing cup for cooperation with a master cylinder and a piston, with a bleed passage therein, movable in the cylinder, said cup comprising a lateral portion having a surface snugly engageable with the cylinder wall, the lateral portion being provided with an annular groove surrounding the packing cup to facilitate the forward movement of fluid through the bleed passage of the piston and past said portion.

5. A packing cup for a movable master cylinder piston, said cup comprising a peripheral portion having a cylindrical surface engageable with the inner wall of a master cylinder, there being an annular peripheral groove in the cylindrical surface, and a plurality of groove extending axially to the base of the cup from the annular groove.

6. A packing cup for cooperation with a master cylinder and a piston movable therein, said cup comprising a disk portion having a relatively low compressibility, and a flange portion having a relatively great radial compressibility, said disk portion having a groove therein to facilitate the passage of fluid forwardly over the packing cup.

7. A packing member for cooperation with a master cylinder and a piston, with a bleed passage therein, movable in the cylinder, said packing member being engageable with the piston to close the passage therethrough during the forward movement of the piston, and adapted to uncover the passage during rearward movement of the piston to allow fluid to pass forwardly over the packing member, said packing member having a longitudinal groove to facilitate the forward movement of the fluid.

8. A packing member carried by a piston and movable thereby in sliding engagement with the wall of a master cylinder, said packing member having an annular groove surrounding said member peripherally, and a plurality of grooves extending axially of said member at its periphery.

9. In a hydraulic brake system, a master cylinder, a piston having an annular recess, and movable in said cylinder, said piston having passageways from the annular recess through the piston to the forward face thereof, a fluid supply source in constant communication with the annular recess, said master cylinder having a passage connecting the cylinder with said fluid source at a point in front of said piston when the piston is in its retracted position, and a packing member comprising a peripheral portion having a plurality of grooves through a portion of its length, said packing member being seated on said piston and carried thereby, the grooves in the packing member being offset from the passages through the piston whereby engagement of the packing member with the piston closes the passages and the grooves during the forward movement of the piston and allows fluid to pass therethrough and over the packing member during the rearward movement of the piston.

10. In a hydraulic brake system, a master cylinder, a piston having an annular recess, and movable in said cylinder, said piston having passageways from the annular recess through the piston to the forward face thereof, a fluid supply source in constant communication with the annular recess, said master cylinder having a passage connecting the cylinder with said fluid source at a point in front of said piston when the piston is in its retracted position, and a packing member comprising a peripheral portion, an annular peripheral groove, and a plurality of axial grooves extending from the peripheral groove to the rear side of the packing member, said packing member being seated on said piston and carried thereby, the axial grooves in the packing member being offset from the passages through the piston whereby engagement of the packing member with the face of the piston closes the passages and the axial grooves during the forward movement of the piston, and allows fluid to pass therethrough and over the packing member during the rearward movement of the piston.

In witness whereof, I hereunto subscribe my name this 30th day of August, 1928.

MALCOLM LOUGHEAD.